Dec. 25, 1956 E. W. CARSON 2,775,343

MATCHBOOK HOLDER

Filed May 29, 1953

INVENTOR.
EARL W. CARSON

BY S. Jay Teller

ATTORNEY

United States Patent Office 2,775,343

Patented Dec. 25, 1956

2,775,343

MATCHBOOK HOLDER

Earl W. Carson, Thompsonville, Conn.

Application May 29, 1953, Serial No. 358,437

7 Claims. (Cl. 206—31)

The invention relates to a device adapted to be connected with a suitable support and constructed and arranged for holding a matchbook in such a manner that the matchbook is in fixed position with respect to the device so as to be readily available for convenient use.

One object of the invention is to provide a holder for the stated purpose having means which make it possible for the holder to be readily attached to the peripheral flange on the base of a telephone, the holder being held in its attached position on the telephone base by engagement with the horizontal surface that supports the said base.

Another object of the invention is to provide a holder for the stated purpose having various advantageous features of construction which enable a matchbook to be readily attached thereto and firmly held.

Various other objects of the invention will be apparent from the drawing and from the following description.

In the drawing I have shown several embodiments of the invention, but it will be understood that various changes may be made from the constructions shown, and that the drawing is not to be construed as defining or limiting the scope of the invention, the claims forming a part of this specification being relied upon for that purpose.

*Figs. 1 to 3*

Figures 1, 2, 3, 4, 5, 6, 7, 8, 9, 10, 11:
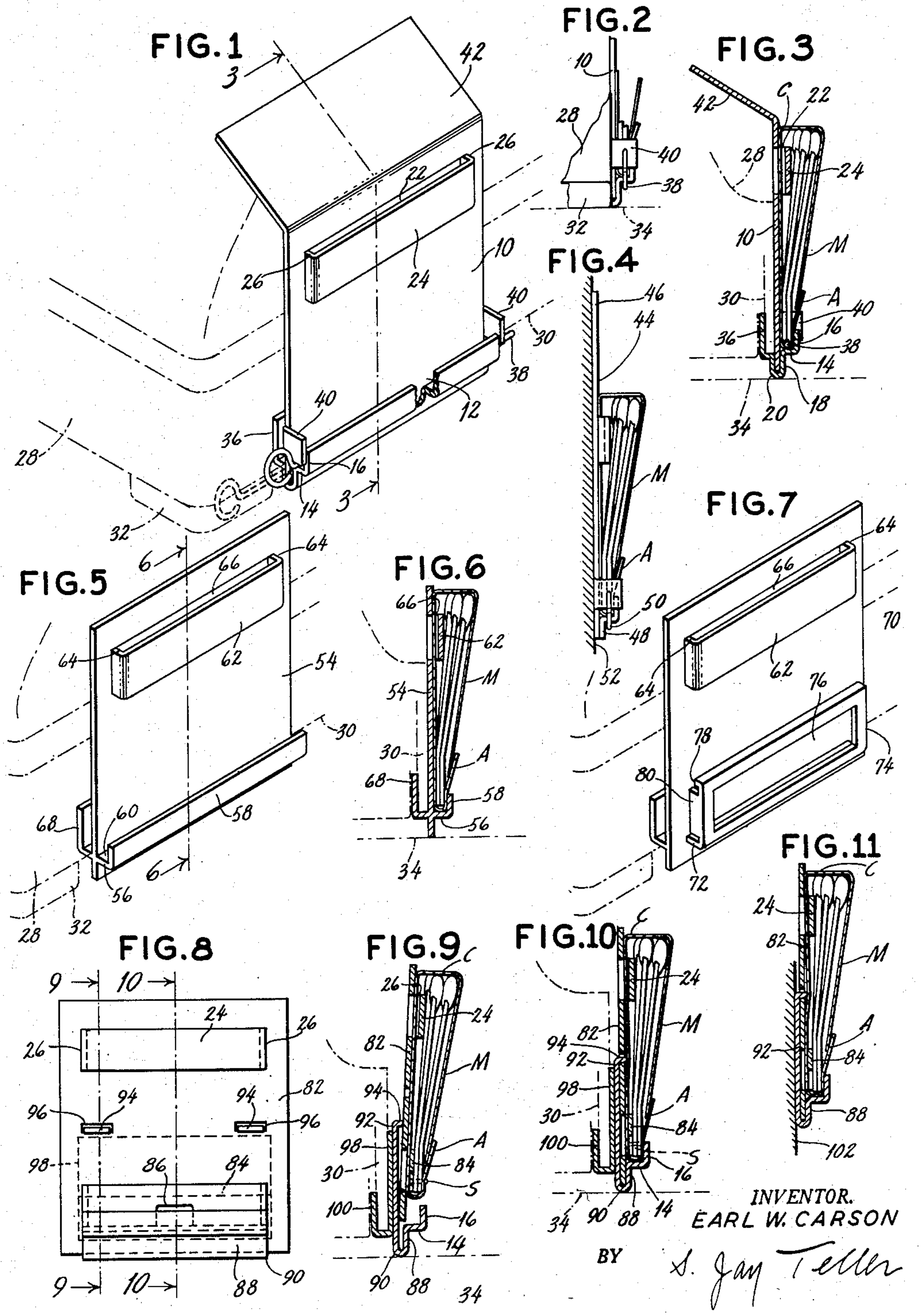
Fig. 1 is a perspective view of a matchbook holder embodying the invention, this view also showing in phantom a portion of a telephone base with which the holder is adapted to be used.
Fig. 2 is a fragmentary side elevation of the lower portion of the holder shown in Fig. 1 together with a portion of the telephone base, this view showing a matchbook engaged with the holder.
Fig. 3 is a central vertical sectional view taken along the line 3—3 of Fig. 1, this view also showing a matchbook engaged with the holder.
Fig. 4 is a side view of a holder similar to that shown in Figs. 1 to 3 but adapted to be secured to a wall instead of being connected with a telephone base.
Fig. 5 is a perspective view similar to Fig. 1 but showing an alternative embodiment of the invention.
Fig. 6 is a central vertical sectional view taken along the line 6—6 of Fig. 5, this view showing a matchbook engaged with the holder.
Fig. 7 is a perspective view similar to Fig. 4 but showing another alternative embodiment of the invention.
Fig. 8 is a front view of still another alternative embodiment of the invention.
Fig. 9 is a vertical sectional view taken along the line 9—9 of Fig. 8 but with one of the parts in a different position, this view showing a portion of the telephone base and also showing a matchbook.
Fig. 10 is a vertical sectional view taken along the line 10—10 of Fig. 8 and showing the parts in the same positions as in Fig. 8, this view also showing a matchbook.
Fig. 11 is a view similar to Fig. 10 but showing still another embodiment of the invention.

Referring to the drawing, more particularly Figs. 1 to 3 thereof, 10 is a flat supporting plate which is normally in vertical position, being held in this position by means to be described. Preferably the plate has vertical side edges, and its vertical length and its horizontal transverse width between the side edges are at least as large respectively as the vertical length and transverse width of an upright closed matchbook.

A means is normally fixedly connected with the plate near the bottom thereof which is constructed to provide a transverse horizontal groove 12 at the front of the plate. The groove 12 is closed at its bottom and open at its top and is of such size as to constitute a seat for receiving and closely fitting the lower portion of an upright matchbook M at the bottom of the said lower portion and at the front and rear thereof. Preferably the means that provides the said groove 12 includes a forwardly projecting horizontal ledge 14 and an upwardly projecting vertical flange 16 at the front edge of the ledge. The ledge 14 and the flange 16 cooperate with the adjacent portion of the plate 10 to provide the said groove 12. The flange 16 terminates at the top thereof near the bottom of the striking area A of the matchbook so that the said striking area is exposed when the lower portion of the matchbook is held by the said seat. The ledge 14 and the flange 16 may advantageously be parts of a separate sheet metal element 18 which is normally fixedly connected to the plate 10. The element 18 is shown as being bent at 20 to extend around the bottom of the plate 10. The element 18 may be connected with the plate 10 by spot welding or otherwise.

A means is fixedly located on the plate 10 at the top thereof for providing a narrow vertical slot 22 at the front of the plate for receiving and loosely fitting the upper rear portion of the cover C of the matchbook to prevent relative forward movement of the upper portion of the matchbook when its lower portion is held by the said seat. Preferably and as shown, there is a horizontally extending thin strip 24 near the upper portion of the plate 10 and when the plate is formed of sheet metal the strip 24 may be an integral portion thereof partly separated therefrom and pressed forwardly. The rear face of the strip 24 is spaced slightly forwardly from the front face of the plate to provide the said slot 22. The end portions 26, 26 of the strip 24 extend rearwardly to join the main body of the plate 10.

Two transversely spaced abutments are provided in normally fixed relationship to the plate 10 at the front thereof and the said abutments are positioned for engaging the sides of a matchbook engaged by the said seat 12 to limit transverse or horizontal movement of the matchbook. As shown, the end portions 26, 26 of the strip 24 constitute the said abutments, these being spaced apart by a distance only slightly greater than the width of the matchbook.

In assembling a matchbook with a holder, the cover is opened and is threaded upwardly through the slot 22. Then the matchbook is lowered to enter the lower portion thereof in the seat or groove 12. After that the cover C can be returned to its normal position. The abutments 26, 26 limit transverse movement of the matchbook relatively to the plate 10.

As shown in Figs. 1 to 3, means is provided for attaching the matchbook holder to the base of a telephone. As shown in Fig. 3, the base 28 of the telephone has downwardly extending peripheral flanges 30 along its faces. The said base 28 has supporting pads 32 at the corners thereof which rest upon a horizontal surface 34 which may be the top of a table or desk. By reason of the pads 32 the bottoms of the flanges 30 are spaced upwardly from the supporting surface 34. The plate 10 is provided at its rear with means for face-to-face engagement with the outer face at one side of said telephone base. As shown, the last said means is the rear or inner face of said plate, but said means may be additional to said plate as hereinafter explained. A transversely extending upwardly projecting holding wall 36 is normally fixedly connected with the plate 10 and the said wall 36 is so positioned and is so spaced from the plate 10 that it is located behind the flange 30 of the telephone base so as to frictionally engage the said flange 30 and so as to hold the said plate or said means thereon against the corresponding face of the base. The wall 36 and the engaging means on said plate 10 are so formed and related that they provide a horizontal channel between them which is entirely open at its ends and is adapted to receive the downwardly extending flange 30 at said side of said telephone base with the said holding wall engaging and fitting the inner or rear face of said flange. For assembly the telephone base is lifted and then lowered with the wall 36 in the relative position shown. A supporting means at the lower portion of the plate 10 rests upon the supporting surface 34, thus positively holding the parts in the relationship shown so long as the base 28 rests upon the supporting surface 34. By reason of the frictional engagement of the wall 36 with the telephone base flange 30, the holder will remain attached to the telephone base when the said base is lifted. The said means on the plate 10 which engages the supporting surface 34 is shown as being the bent portion 20 of the element 18, but said means may be the lower edge of said plate. When a separate element 18 is provided, the wall 36 for engaging the telephone base flange 30 may be formed as a part of the said element 18.

The holder is shown in Fig. 1 as attached to the telephone base 28 at the right side thereof. However, it may be connected with the front thereof or with the left side thereof according to the preference or convenience of the user. With the holder in place and connected with the telephone base, the matchbook M is held in a convenient position for use during telephoning.

While the invention is not necessarily so limited, the holder is shown in Figs. 1 to 3 as including a transverse horizontal pin 38 having its main portion normally located within the groove or seat 12 and positioned to extend through a matchbook held by the said seat. Means are provided for guiding the pin 38 for endwise movement, and as shown the said means are tabs 40, 40 formed integrally with the plate 10 and bent forwardly to overlie the pin 38. The pin 38 is withdrawn to permit the engagement of a matchbook with the seat 12 and it is then moved endwise beneath the tabs 40, 40 to lock the matchbook in place.

A holder embodying the invention is adapted to serve as an advertising novelty. For this purpose the plate 10 has an upward extension 42 preferably inclined toward the rear. The plate extension 42 is adapted to carry an advertising message.

*Fig. 4*

Fig. 4 shows a matchbook holder similar to that shown in Figs. 1 to 3 but not adapted for attachment to a telephone base. A supporting plate 44 is provided which may be identical in construction with the plate 10, except that its extension 46 is in the same plane as the main body of the plate and not inclined rearwardly. A separate sheet metal element 48 is provided which is similar to the element 18, except that it does not have a portion such as 20 bent around the bottom of the plate and does not have a wall such as 36 at the rear. A locking pin 50 may be provided which is identical in construction with the pin 38.

The plate 44 has an unobstructed flat rear face which is engageable with a flat supporting surface 52. The plate 44 may be attached to the surface 52 by cementing or by suitable mechanical attaching devices, such as screws which are not shown. For convenience of disclosure, the plate 44 and the supporting surface 52 are shown and described as vertical, but the invention is not so limited.

*Figs. 5 and 6*

The holder shown in Figs. 5 and 6 is generally similar to that shown in Figs. 1 to 3, except that the holder is not formed of sheet metal but is a single molded plastic piece.

A plate 54 is provided which is similar to the plate 10. Formed integrally with the plate 54 is a ledge 56 and a flange 58 which cooperate with the adjacent portion of the plate to form a groove or seat 60 similar to the groove or seat 12. Formed integrally with the plate 54 is a strip 62 having end portions or abutments 64, 64, these being similar respectively to the parts 24 and 26, 26. The strip 62 cooperates with the plate 54 to form a slot 66 for the matchbook cover. Also formed integrally with the plate 54 at the rear thereof is a wall 68 similar in position and function to the wall 36. When the holder is engaged with a telephone base, the lower edge of the plate 54 engages directly with the supporting surface 34. The holder as shown in Figs. 5 and 6 does not include a locking pin such as 38.

The manner of use of the holder as shown in Figs. 5 and 6 is substantially the same as for the holder shown in Figs. 1 to 3 and repetition of the description is unnecessary.

*Fig. 7*

The holder as shown in Fig. 7 is also a single molded plastic piece and is very similar to that shown in Figs. 5 and 6, but there are differences in the lower front portion. The holder comprises a supporting plate 70 similar to the plate 54. An integral ledge 72 is provided that is similar to the ledge 56. Projecting upwardly from the front portion of the ledge 72 is a flange 74 which differs from the flange 58 in that it projects upwardly to a level near the top of the striking area A of the matchbook. The flange 74 has a rectangular opening 76 therein which exposes the said striking area, which would be completely covered if the opening 76 were not provided.

The flange 74 may be provided at the top with an integral narrow rearward projection 78 which is positioned to overlie the upper edge of the portion of the matchbook that carries the striking area A. This projection 78 tends to prevent upward movement of the matchbook with respect to the holder.

The flange 74 may also be provided at its respective ends with two integral rearward projections 80, only one of which is shown. Spaces are preferably provided between the plate 70 and the rear edges of the projections 80. The said projections 80 serve as additional abutments for limiting transverse movement of the matchbook, cooperating for this purpose with the abutments 64, 64.

*Figs. 8 to 10*

The holder as shown in Figs. 8 to 10 has a sheet metal supporting plate 82 which is generally similar to the plate 10 and which is provided with a similar strip 24 and similar abutments 26, 26.

In addition to the strip 24, the plate 82 has an additional similar strip 84 near the bottom thereof. In attaching the matchbook M to the plate 82 the rear portion of the cover C is threaded through the lower slot between the strip 84 and the plate and also through the upper slot between the strip 24 and the plate. The lower strip 84 may have a notch 86 to provide clearance for the rear portion of the staple.

A separate sheet metal element 88 is provided which is somewhat similar to the element 18 and which has a similar ledge 14 and a similar flange 16. The element 88 is bent at 90 to extend around the bottom of the plate, but the plate 82 is not permanently connected with the element 88, being detachable therefrom by relative upward movement.

The sheet metal element 88 has an upwardly projecting rear portion 92 which has forwardly extending teeth 94, 94 thereon. The teeth 94, 94 can enter holes 96, 96 in the plate 82 to lock the plate 82 in fixed relationship with the element 88, as shown in Fig. 10. The plate 82 can be flexed forwardly to disengage the teeth 94, 94, and when disengaged from the teeth the plate 82 can be moved upwardly for disengagement or downwardly for engagement. In use, the matchbook is engaged with the plate 82 while the plate is separated from the element 88. Thereafter the plate is engaged with the element by downward movement from the position shown in Fig. 9 to the position shown in Fig. 10.

A separate sheet metal element 98 is permanently attached to the rear portion 92 of the element 88 by spot welding or otherwise. The element 98 has a wall 100 similar in position and function to the wall 36. The element 98 constitutes the means at the rear of the main plate which is in face-to-face engagement with the outer face of one side of the telephone base. The element 88 is attached to the telephone base by means of the flange 100, but the plate 82 is detachable from the element 88 to facilitate the attachment of a matchbook thereto.

*Fig. 11*

The holder as shown in Fig. 11 is identical in construction with that shown in Figs. 1 to 10 except that the element 98 is omitted. The rear face of the rear portion 92 of the element 88 is unobstructed and flat and the said element can be attached directly to a supporting wall 102.

The invention claimed is:

1. A matchbook holder comprising a main plate normally in vertical position and provided at its rear with means for face-to-face engagement with the outer face at one side of a telephone base resting on a horizontal supporting surface, an upwardly projecting holding wall spaced rearwardly from the plate and positioned in normally fixed parallel relationship therewith, said wall and the engaging means on said main plate being so formed and related that they provide a horizontal channel between them which is entirely open at its ends and is adapted to receive the downwardly extending flange at said side of said telephone base with the said holding wall engaging and fitting the inner or rear face of said flange, supporting means at the bottom of the plate and in normally fixed relationship therewith for engaging said horizontal supporting surface to prevent downward movement of said plate and said wall relatively to said telephone base, and means in normally fixed relationship with the plate for engaging a matchbook at the front of the plate to hold said matchbook in normally fixed relationship with said plate and in fixed relation to said telephone base when said plate and said wall are engaged as stated.

2. A matchbook holder comprising a main plate normally in vertical position and provided at its rear with means for face-to-face engagement with the outer face at one side of a telephone base resting on a horizontal supporting surface, an upwardly projecting holding wall spaced rearwardly from the plate and above the bottom thereof and positioned in normally fixed parallel relationship therewith, said wall and the engaging means on said plate being so formed and related that they provide a horizontal channel between them which is entirely open at its ends and is adapted to receive the downwardly extending flange at said side of said telephone base with the said holding wall engaging and fitting the inner or rear face of said flange, supporting means at the bottom of the plate and in normally fixed relationship therewith and spaced downwardly from the bottom of said wall for engaging said horizontal supporting surface to prevent downward movement of said plate and said wall relatively to said telephone base, and means in normally fixed relationship with the plate and spaced upwardly from said supporting means for engaging a matchbook at the front of the plate to hold said matchbook in normally fixed relationship with said plate and in fixed relation to said telephone base when said plate and said wall are engaged as stated.

3. A matchbook holder comprising a main plate normally in vertical position and provided at its rear with means for face-to-face engagement with the outer face at one side of a telephone base resting on a horizontal supporting surface, an upwardly projecting holding wall spaced rearwardly from the plate and positioned in normally fixed parallel relationship therewith, said wall and the engaging means on said main plate being so formed and related that they provide a horizontal channel between them which is entirely open at its ends and is adapted to receive the downwardly extending flange at said side of said telephone base with the said holding wall engaging and fitting the inner or rear face of said flange, supporting means at the bottom of the plate and in normally fixed relationship therewith for engaging said horizontal supporting surface to prevent downward movement of said plate and said wall relatively to said telephone base, means in normally fixed relationship with the plate near the bottom thereof for providing a transverse horizontal groove at the front thereof which groove is closed at its bottom and is open at its top and is of such size as to constitute a seat for receiving and closely fitting the lower portion of an upright matchbook, and means fixedly located on the plate near the top thereof and at the front thereof forming a narrow vertical slot for receiving and loosely fitting the upper rear portion of the cover of a matchbook to prevent relative forward movement of the upper portion of a matchbook having its lower portion held by the said seat.

4. A matchbook holder comprising a flat sheet metal supporting plate normally in vertical position, a sheet metal element detachable from said plate and bent to extend around the bottom thereof and to engage the front and rear faces thereof when the plate and the element are assembled by relative downward movement of the plate which element includes a forwardly projecting horizontal ledge and an upwardly projecting vertical flange at the front edge of the ledge, the said ledge and flange when the plate and the element are assembled cooperating with the plate to provide a transverse horizontal groove at the front of the plate which groove is closed at its bottom and open at its top and is of such size as to constitute a seat for receiving and closely fitting the lower portion of an upright matchbook at the bottom of the said lower portion and at the front and rear thereof, means fixedly located on the plate near the top thereof forming a narrow vertical slot at the front of the plate for receiving and loosely fitting the upper rear portion of the cover of a matchbook to prevent relative forward movement of the upper portion of a matchbook having its lower portion held by the said seat, and two transversely spaced abutments fixedly located on the plate at the front thereof and positioned for engaging the sides of a matchbook held by the said seat to limit transverse or horizontal movement of the said matchbook.

5. A matchbook holder comprising a flat sheet metal supporting plate normally in vertical position, a sheet metal element detachable from said plate and bent to extend around the bottom thereof and to engage the front and rear faces thereof when the plate and the element are assembled by relative downward movement of the plate which element includes a forwardly projecting horizontal ledge and an upwardly projecting vertical flange at the front edge of the ledge, the said ledge and flange when the plate and the element are assembled cooperating with the plate to provide a transverse horizontal groove at the front of the plate which groove is closed at its bottom and open at its top and is of such size as to constitute a seat for receiving and closely fitting the lower portion of an upright matchbook at the bottom of the said lower portion and at the front and rear thereof, and two horizontally extending thin strips respectively near the upper portion and the lower portion of the plate and each having a main portion which is positioned with its rear face spaced slightly forwardly from the front face of the plate and each of which extends horizontally through a distance at least as large as the width of a matchbook and each having portions which extend rearwardly from the ends of the main portion and are fixedly connected with the plate, the said main portions of the strips cooperating with the plate to provide two vertical slots for receiving and loosely fitting respectively the upper and lower rear portions of the cover of a matchbook having its lower portion held by the said seat and the said rearwardly extending portions of the strips constituting abutments for limiting transverse or horizontal movement of the said matchbook.

6. A matchbook holder comprising a flat sheet metal supporting plate normally in vertical position, a sheet metal element detachable from said plate and bent to extend around the bottom thereof and to engage the front and rear faces thereof when the plate and the element are assembled by relative downward movement of the plate which element includes a forwardly projecting horizontal ledge and an upwardly projecting vertical flange at the front edge of the ledge, the said ledge and flange when the plate and the element are assembled cooperating with the plate to provide a transverse horizontal groove at the front of the plate which groove is closed at its bottom and open at its top and is of such size as to constitute a seat for receiving and closely fitting the lower portion of an upright matchbook at the bottom of the said lower portion and at the front and rear thereof, means fixedly located on the plate near the top thereof forming a narrow vertical slot at the front of the plate for receiving and loosely fitting the rear portion of the cover of a matchbook to prevent relative forward movement of the upper portion of a matchbook having its lower portion held by the said seat, two transversely spaced abutments fixedly located on the plate at the front thereof and positioned for engaging the sides of a matchbook held by the said seat to limit transverse or horizontal movement of the said matchbook, and interengaging means on the plate and on the element for locking them in assembled relationship which means is constructed for disengagement upon flexing of the plate relatively to the element.

7. A matchbook holder comprising a flat sheet metal supporting plate normally in vertical position, a sheet metal element detachable from said plate and bent to extend around the bottom thereof and to engage the front and rear faces thereof when the plate and the element are assembled by relative downward movement of the plate, the lower bent portion of the said element being engageable with a horizontal supporting surface and the said element including a forwardly projecting horizontal ledge and an upwardly projecting vertical flange at the front edge of the ledge, the said ledge and flange when the plate and the element are assembled cooperating with the plate to provide a transverse horizontal groove at the front of the plate which groove is closed at its bottom and open at its top and is of such size as to constitute a seat for receiving and closely fitting the lower portion of an upright matchbook at the bottom of the said lower portion and at the front and rear thereof, a transversely extending upwardly projecting wall on the said element at the rear thereof which wall is spaced rearwardly from the element and is positioned for engagement with the inner face of the downwardly extending flange at one side of a telephone base on the said supporting surface, said upwardly projecting wall being normally held in engagement with said telephone flange face by the engagement of said lower bent portion of said element with said horizontal supporting surface, and means fixedly located on the plate near the top thereof forming a narrow vertical slot at the front of the plate for receiving and loosely fitting the upper rear portion of the cover of a matchbook to prevent relative forward movement of the upper portion of a matchbook having its lower portion held by the said seat.

References Cited in the file of this patent

UNITED STATES PATENTS

| | | |
|---|---|---|
| 792,335 | Lewi | June 13, 1905 |
| 965,603 | Seeley | July 26, 1910 |
| 1,088,254 | Astruck | Feb. 24, 1914 |
| 1,432,372 | Warren | Oct. 17, 1922 |
| 1,509,999 | Girsch | Sept. 30, 1924 |
| 1,913,142 | Ondricek | June 6, 1933 |
| 1,921,876 | Grunwald | Aug. 8, 1933 |
| 1,974,776 | Hagel | Sept. 25, 1934 |
| 2,013,551 | Collette | Sept. 3, 1935 |
| 2,564,517 | Beals | Aug. 14, 1951 |
| 2,640,588 | Dunn | June 2, 1953 |

FOREIGN PATENTS

| | | |
|---|---|---|
| 24,918 | Great Britain | of 1898 |